(12) United States Patent
Chapman (10) Patent No.: US 11,965,489 B2
(45) Date of Patent: Apr. 23, 2024

(54) COUPLING DEVICE

(71) Applicant: Kinetrol Limited, Surrey (GB)

(72) Inventor: Roger Charles Chapman, Surrey (GB)

(73) Assignee: KINETROL LIMITED, Surrey (GB)

( * ) Notice: Subject to any disclaimer, the term of this patent is extended or adjusted under 35 U.S.C. 154(b) by 4 days.

(21) Appl. No.: 17/749,356

(22) Filed: May 20, 2022

(65) Prior Publication Data
US 2022/0412324 A1 Dec. 29, 2022

(30) Foreign Application Priority Data
May 20, 2021 (GB) .................................... 2107251

(51) Int. Cl.
*F16K 31/04* (2006.01)
*F03G 1/02* (2006.01)
*F16D 1/02* (2006.01)
*F16D 1/10* (2006.01)

(52) U.S. Cl.
CPC ............ *F03G 1/022* (2021.08); *F16K 31/043* (2013.01); *F16K 31/047* (2013.01); *F16D 1/02* (2013.01); *F16D 2001/102* (2013.01)

(58) Field of Classification Search
CPC ...... F16K 31/043; F16K 31/047; F16K 31/56; F16K 31/563; F16D 1/02; F16D 2001/102; F03G 1/022
See application file for complete search history.

(56) References Cited

U.S. PATENT DOCUMENTS

| 3,122,351 | A | * | 2/1964 | Brown ................ F16K 31/1635 74/2 |
| 3,279,744 | A | * | 10/1966 | Fieldsen ............... F16K 31/055 251/71 |
| 4,130,182 | A | | 12/1978 | Aunspach |
| 9,151,351 | B2 | * | 10/2015 | Underwood, Jr. ........ F16F 1/10 |
| 2003/0026034 | A1 | | 2/2003 | Chapman |
| 2012/0264562 | A1 | | 10/2012 | Park |

OTHER PUBLICATIONS

Search Report for GB 2107251.7 dated Oct. 14, 2021.

* cited by examiner

*Primary Examiner* — Matthew W Jellett
(74) *Attorney, Agent, or Firm* — Stephen J. Weyer, Esq.; Stites & Harbison, PLLC (57) ABSTRACT

The present invention provides a coupling device for coupling a rotary actuator to a mechanical device having a rotatable shaft. The coupling device comprises a spring return module with a first rotatable coupling configured to engage a first portion of the shaft, and a spring engaged with the first rotatable coupling, wherein the first rotatable coupling is rotatable about a rotation axis, and wherein rotation of the rotatable coupling about the rotation axis in a first direction causes mechanical energy to be stored in the spring. The coupling device further comprises an actuator coupling module comprising a second rotatable coupling. The second rotatable coupling is configured to engage a second portion of the shaft, the second rotatable coupling being further engageable with an output of the rotary actuator. The second rotatable coupling is rotatable about the rotation axis, the second rotatable coupling being rotatable relative to the first rotatable coupling about the rotation axis.

14 Claims, 4 Drawing Sheets

COUPLING DEVICE

FIELD OF THE INVENTION

The present invention relates to a coupling device for coupling a rotary actuator to a mechanical device having a rotatable shaft, the coupling device including a spring return module.

BACKGROUND TO THE INVENTION

Spring return devices are used as mechanical fail-safe devices. They are used to return mechanical devices, for example a valve, to a pre-determined safe condition using mechanical energy stored in a spring, typically a rotary spring such as a clock-spring.

A typical spring return device as conventionally used comprises a rotatable shaft, a clock-spring engaged with the rotatable shaft, and a retaining band surrounding the clock-spring and secured to the clock-spring by a retaining screw. When the rotatable shaft is rotated in a first direction relative to the retaining band, the clock-spring is wound up within the retaining band so that it stores mechanical energy and provides a torque on the rotatable shaft that acts to rotate the rotatable shaft in an opposite second direction. Thus, the effect of the clock-spring is to provide a force on the rotatable shaft that acts to counteract rotation of the rotatable shaft in the first direction.

In practice, a spring return device is typically used to apply a torque to rotate a rotatable shaft of a mechanical device, such as a valve, back to a predetermined position when the rotatable shaft is rotated away from the predetermined position to change an operational state of the mechanical device. In such an arrangement, the rotatable shaft of the spring return device is coupled to the rotatable shaft of the mechanical device, so that rotation of the rotatable shaft in the first direction causes mechanical energy to be stored in the clock-spring and a corresponding torque to be applied to the rotatable shaft that acts to rotate it in the second direction back to a predetermined position.

In practice, the predetermined position of the rotational shaft corresponds to a predetermined safe or desired operational state of the mechanical device, for example a position at which a valve is open or closed (depending on the particular circumstances).

Commonly, a spring return device is used in conjunction with a rotary actuator, such as an electric, pneumatic or hydraulic powered rotary actuator.

Rotary actuators are used to control the operation of mechanical devices by applying a torque to rotate a rotatable shaft of the mechanical device, e.g. to open or close a valve. For example, when a pneumatic rotary actuator is provided with a pressurised air supply, the pneumatic rotary actuator will provide a torque to rotate a shaft of the mechanical device to change an operational state of the mechanical device (e.g. to open or close a valve).

A spring return device can be used in conjunction with a powered rotary actuator to provide automatic return of the mechanical device controlled by the powered rotary actuator to a predetermined safe or desired condition in the event of the interruption or failure of power (e.g. electrical power, pneumatic power or hydraulic power) to the powered rotary actuator.

In the absence of a spring return device, in the event of unexpected interruption of power to the powered rotary actuator, for example in the event of the interruption of a pressurised air supply to a pneumatic rotary actuator, the mechanical device will stay in the operational state it was in at the time of the interruption. This operational state may be an unsafe or undesirable operational state of the mechanical device.

To overcome this problem, it is known to provide a spring return device in conjunction with the powered rotary actuator to provide a torque to return the rotatable shaft of the mechanical device to an orientation that corresponds to a predetermined safe or desired condition of the mechanical device in the event of interruption of power to the powered rotary actuator. Thus, the spring return device acts as a fail-safe device that prevents the mechanical device from remaining in an unsafe or undesirable operational state in the event of interruption of power to the powered rotary actuator.

Typically, the spring return device is positioned between the powered rotary actuator and the mechanical device, with the rotatable shaft of the spring return device coupled to both a rotatable driver shaft of the powered rotary actuator and a rotatable driven shaft of the mechanical device. For example, the rotatable driven shaft may be clamped to one end of rotatable shaft of the spring return device, whilst the rotatable driver shaft may be clamped to another end of the rotatable shaft of the spring return device. Then, when sufficient power is supplied to the rotary actuator, the driver shaft, the rotatable shaft of the spring return device, and the driven shaft are rotated in the first direction to change an operational state of the mechanical device, for example to open a valve. This rotation is against the torque provided by the clock-spring, and power must be continually provided to the powered rotary actuator to balance the torque provided by the clock-spring to maintain the driven shaft in the desired orientation.

In the event of interruption of power to the powered rotary actuator, the torque provided by the clock-spring will no longer be balanced by the powered rotary actuator, and therefore this torque will rotate the rotatable shaft of the spring return device, the driver shaft and the driven shaft in the second direction to change the operational state of the mechanical device to a predetermined state. Thus, the spring return device acts as a mechanical fail-safe device that returns the mechanical device to a predetermined state in the event of interruption of the supply of power to the powered rotary actuator.

SUMMARY OF THE INVENTION

The present inventor has realised that the manner in which the rotary actuator, spring return device, and mechanical device are conventionally coupled together can result in an inherent amount of play (or backlash), which may reduce an accuracy with which the rotatable shaft of the mechanical device can be rotated. Such play may arise, for example, in the connection between the rotatable shaft of the spring return device and the rotatable shaft of the mechanical device. In particular, even where the parts are manufactured to high levels of machining tolerance, a certain amount of play (e.g. free movement) between the parts may be unavoidable, due to limitations on the accuracy with which the parts can be manufactured. For example, where there is a male-female connection between the rotatable shaft of the spring return device and the rotatable shaft of the mechanical device, and/or where a clamp is used to secure these parts together, inaccuracies or defects in the shapes of these parts may mean that they do not match perfectly, such that a small amount of movement between these parts is possible.

Due to the play (or backlash) between the rotatable shaft of the spring return device and the rotatable shaft of the mechanical device, rotation of the rotary actuator's rotatable driver shaft may not be perfectly transmitted to the rotatable shaft of the mechanical device. For example, this may result in a delay between rotation of rotatable driver shaft and the rotatable shaft of the mechanical device. This may also mean that angular movements of the rotatable driver shaft that are below a threshold angle are not transmitted to the rotatable shaft of the mechanical device, with the threshold angle depending on the amount of play in the system. As a result, there may be a limit on the accuracy and reproducibility with which the angle of the rotatable shaft of the mechanical device can be adjusted by the rotary actuator. This may correspond to what is known as a 'deadband', where the rotatable driver shaft is not rotated in response to rotation of the rotary actuator's rotatable driver shaft below a threshold angle.

At its most general, the present invention provides a coupling device for coupling a rotary actuator to a mechanical device, which avoids the backlash issues observed in the prior art, so as to improve an accuracy with which the mechanical device can be controlled. The coupling device includes a spring return module comprising a first rotatable coupling configured to engage a first portion of a rotatable shaft of the mechanical device. The device further includes a second rotatable coupling which is configured to engage a second portion of the rotatable shaft of the mechanical device, the second rotatable coupling being engageable with the rotary actuator. Thus, the spring return module acts on the first portion of the rotatable shaft of the mechanical device via the first rotatable coupling, whilst the rotary actuator acts on the second portion of the shaft via the second rotatable coupling. The spring return module may be arranged to apply a torque that opposes a torque applied to the shaft by the rotary actuator. Due to the opposing torques applied on the shaft by the spring return module and the rotary actuator, backlash between the rotary actuator and the shaft may be avoided. In particular, as the spring return module acts on the shaft in an opposite direction to the rotary actuator, the shaft is effectively rotationally locked to the driver shaft of the rotary actuator. In this manner, an angular position of the shaft of the mechanical device can be accurately controlled.

Such accurate control of the angular position of the shaft may be beneficial in many different applications. For example, where the mechanical device is a valve, this may enable accurate control of opening and closing of the valve, e.g. to enable accurate control of a fluid flow through the valve. In particular, this may enable fine and reproducible adjustments to be made to the position of the valve.

Conventional methods for reducing play between the rotary actuator and rotatable shaft may typically involve a clamp arrangement, where the rotatable shaft is clamped to the output of the rotary actuator. However, as noted above, such clamped connections may still involve an inherent amount of play. Moreover, the strength of such a clamped connection may be difficult to set accurately and reproducibly, which may affect the accuracy which the rotational position of the rotatable shaft can be adjusted. Such a clamped connection may also be relatively large, and may need to be located outside of the device (e.g. to enable assembly and disassembly). Due to its external location, the clamped connection may be more prone to environmental effects, such as corrosion.

According to a first aspect of the invention, there is provided a coupling device for coupling a rotary actuator to a mechanical device having a rotatable shaft, the coupling device comprising: a spring return module, the spring return module comprising: a first rotatable coupling configured to engage a first portion of the shaft; a spring engaged with the first rotatable coupling, wherein the first rotatable coupling is rotatable about a rotation axis, and wherein rotation of the rotatable coupling about the rotation axis in a first direction causes mechanical energy to be stored in the spring; and an actuator coupling module comprising a second rotatable coupling; wherein the second rotatable coupling is configured to engage a second portion of the shaft, the second rotatable coupling being further engageable with an output of the rotary actuator; and wherein the second rotatable coupling is rotatable about the rotation axis, the second rotatable coupling being rotatable relative to the first rotatable coupling about the rotation axis.

The coupling device may be used with any suitable type of rotary actuator. A rotary actuator is an actuator for causing rotation of a shaft, e.g. by applying a torque to the shaft. The rotary actuator may comprise a rotatable output shaft (which may also be referred to as a driver shaft), which the rotary actuator is configured to rotate. The rotary actuator may be manually powered, e.g. via a handle for applying a torque, or may be electrically, pneumatically, or hydraulically powered. For example, the rotary actuator may include a pneumatic rotary actuator, or an electrical rotary actuator, or a hydraulic rotary actuator. The rotary actuator may also include a stepper motor or a servomotor.

The mechanical device may be any type of device comprising a rotatable shaft. The shaft of the mechanical device may also be referred to as a rotatable driven shaft (as its rotation may be driven by the rotary actuator). The mechanical device may be operable by means of the rotatable shaft, e.g. the shaft may be rotated to control an operational state of the mechanical device. For example, the mechanical device may comprise a valve, with the shaft being rotatable to control opening and closing of the valve. Other types of mechanical device including a rotatable shaft may also be used.

The spring return module (which may also be referred to as a spring return device) may act as a fail-safe, to return the mechanical device to a predetermined state, e.g. in the event of interruption of power to the rotary actuator.

The first rotatable coupling is configured to engage a first portion of the shaft of the mechanical device. The first rotatable coupling may comprise a first coupling part that is configured to engage the first portion of the shaft. For example, the first coupling part may include a bore, channel, or passageway configured to receive the first portion of the shaft. The first coupling part may be adapted to a shape of the first portion of the shaft.

The first rotatable coupling is rotatable about a rotation axis. Thus, the first rotatable coupling may be rotatably mounted in the spring return module. The rotation axis may correspond to a longitudinal axis of the shaft, when the first portion of the shaft is engaged with the first rotatable coupling.

The first rotatable coupling may be configured such that, when the first portion of the shaft is engaged with the first rotatable coupling, the shaft rotates with the first rotatable coupling. In other words, the first rotatable coupling may be configured to transfer (or transmit) a torque about the rotation axis to the first portion of the shaft, so that the first rotatable coupling and the shaft rotate together. Thus, when the first portion of the shaft is engaged with the first rotatable coupling, rotation of the first rotatable coupling may cause rotation of the shaft about its longitudinal axis. Likewise, a torque applied by the spring on the first rotatable coupling may be transferred to the first portion of the shaft.

A cross-sectional shape (e.g. in a plane normal to the rotation axis) of the first coupling part may be arranged to match a cross-sectional shape of the first portion of the shaft. In other words, the cross-sectional shapes of the first coupling part and the first portion of the shaft may be complementary. The cross-sectional shape of the first coupling part may be non-circular, to enable a transfer of torque about the rotation axis from the first rotatable coupling to the first portion of the shaft. For example, the cross-sectional shape of the first coupling part may be square, and/or it may have one or more grooves or splines that extend in a direction parallel to the rotation axis.

The spring is engaged with the first rotatable coupling. The engagement between the spring and the first rotatable coupling is such that the spring can apply a torque to the first rotatable coupling. The first rotatable coupling is engaged with the spring such that rotation of the first rotatable coupling in the first direction causes mechanical energy to be stored in the spring. For example, rotation of the first rotatable coupling in the first direction may cause the spring to be wound up, so that it stores mechanical energy. The spring is thus arranged to exert a torque on the first rotatable coupling which acts against rotation of the first rotatable coupling in the first direction, i.e. the spring may urge the first rotatable coupling to rotate in a second direction, opposite to the first direction.

Herein, a first direction and a second direction of rotation may refer to respective ones of a clockwise direction and an anti-clockwise direction.

As an example, the spring may be coupled to, or fixed to, or abut part of, or be received within part of the first rotatable coupling. Typically an end of the spring may be engaged with an engagement part on a side surface of the first rotatable coupling, for example a circumferential surface of the first rotatable coupling. The engagement part may be an indent or a protrusion in the circumferential surface of the first rotatable coupling that is abutted by an end surface of the spring to engage the spring with the first rotatable coupling, or another type of single-sided, one-direction or one-way engagement part or catch.

Alternatively, the engagement part may be a two-direction engagement part. For example, the engagement part may be in the form of a slot for receiving an end part of the spring.

The spring may comprise a helical torsion spring. Thus, the spring may store mechanical energy when it is wound up by rotation of the first rotatable coupling.

The spring may comprise a clock-spring. A clock-spring may correspond to a spiral-wound torsion spring.

The spring may comprise a band of resilient metal wound into a spiral shape.

Herein, mechanical energy stored by a spring may refer to energy stored by the spring in the form of potential energy.

The spring return module may comprise a retainer that retains the spring.

The spring return module may comprise a retainer that retains the spring. The retainer may correspond to a part of the spring return module that functions to retain, or hold, or restrain, or house the spring. The retainer may prevent rotation of the whole of the spring relative to the retainer, so that the spring can be wound up within the retainer to store mechanical energy. A first end of the spring may be coupled to the retainer, whilst a second end of the spring may be engaged with the first rotatable coupling.

The retainer may comprise a band, ring, or housing substantially surrounding the spring. The retainer may therefore substantially surround an outer circumference of the spring, i.e. the spring may be located inside the retainer. Thus, the retainer may contain the spring, i.e. prevent the spring from expanding outwards. The retainer may be substantially circular/cylindrical. The retainer may have one or more mounting parts for fixing the spring return module to the rotary actuator. The retainer may be substantially rigid, e.g. so that it cannot be easily deformed. The retainer may be made of metal and may be made by casting, moulding or extruding. Alternatively, the retainer may be made of a polymeric or plastic material, e.g. by moulding or 3D printing the retainer. Making the retainer out of a plastic material may provide for a more lightweight spring return module.

Where the spring return module includes a retainer, the first rotatable coupling may be rotatable relative to the retainer. Thus, the first rotatable coupling may be connected to the retainer via a suitable rotatable connection. Rotation of the first rotatable coupling relative to the retainer may mean that the first rotatable coupling rotates while the retainer does not rotate.

The actuator coupling module is configured to couple the shaft of the mechanical device to the output of the rotary actuator.

The second rotatable coupling is configured to engage a second portion of the shaft of the mechanical device. The second portion of the shaft may correspond to a part (e.g. length) of the shaft that is adjacent to, or spaced from, the first portion of the shaft. In other words, the first and second portions of the shaft may correspond to respective, mutually exclusive, portions (i.e. lengths or sections) of the shaft.

The second rotatable coupling may comprise a second coupling part that is configured to engage the second portion of the shaft. For example, the second coupling part may include a bore, channel, or passageway configured to receive the second portion of the shaft. The second coupling part may be adapted to a shape of the second portion of the shaft.

The second rotatable coupling is rotatable about the rotation axis (i.e. the same rotation axis as for the first rotatable coupling). Thus, the second rotatable coupling may be rotatably mounted in the actuator coupling module.

The second rotatable coupling may be configured such that, when the second portion of the shaft is engaged with the second rotatable coupling, the shaft rotates with the second rotatable coupling. In other words, the second rotatable coupling may be configured to transfer (or transmit) a torque about the rotation axis to the second portion of the shaft, so that the second rotatable coupling and the shaft rotate together. Thus, when the second portion of the shaft is engaged with the second rotatable coupling, rotation of the second rotatable coupling may cause rotation of the shaft about its longitudinal axis. Likewise, a torque applied by the rotary actuator on the second rotatable coupling may be transferred to the second portion of the shaft.

A cross-sectional shape (e.g. in a plane normal to the rotation axis) of the second coupling part may be arranged to match a cross-sectional shape of the second portion of the shaft. In other words, the cross-sectional shapes of the second coupling part and the second portion of the shaft may be complementary. The cross-sectional shape of the second coupling part may be non-circular, to enable a transfer of torque about the rotation axis from the second rotatable coupling to the second portion of the shaft. For example, the cross-sectional shape of the second coupling part may be square, and/or it may have one or more grooves or splines that extend in a direction parallel to the rotation axis.

The second rotatable coupling is engageable with an output of the rotary actuator, e.g. so that the rotary actuator can apply a torque about the rotation axis to the second rotatable coupling. The output of the rotary actuator may correspond to an output shaft of the rotary actuator.

The second rotatable coupling may include a third coupling part that is configured to engage the output of the rotary actuator. The third coupling part may be adapted to a shape of the output of the rotary actuator. For example, the third coupling part may include a female coupling part, e.g. where the output of the rotary actuator comprises a male coupling part (e.g. a shaft). Typically, a rotary actuator may have an output shaft having a square cross-section. In such a case, the third coupling part may be a female coupling part having a corresponding square-shaped bore. As another example, the third coupling part may include a male coupling part, e.g. where the output of the rotary actuator comprises a female coupling part.

In some embodiments, the second rotatable coupling may form part of the output of the rotary actuator. In other words, the output of the rotary actuator may comprise the second rotatable coupling.

Both the first rotatable coupling and the second rotatable coupling are rotatable about the same rotation axis. Thus, the first rotatable coupling and the second rotatable coupling may be aligned with one another along the rotation axis. Additionally, the second rotatable coupling is rotatable relative to the first rotatable coupling about the rotation axis. In other words, the first and second rotatable couplings may be independently rotatable about the rotation axis (when they are not engaged with the respective portions of the shaft). Thus, when the shaft is not engaged with the first and second rotatable couplings, one of the rotatable couplings may be rotated without causing rotation of the other rotatable coupling.

When the coupling device is in use, the rotatable shaft of the mechanical device extends through the spring return module to the actuator coupling module, such that the first portion of the shaft is engaged in the first rotatable coupling, and the second portion of the shaft is engaged in the second rotatable coupling. Furthermore, the output of the actuator is engaged with the second rotatable coupling. To operate the mechanical device, the rotary actuator may apply a torque in the first direction to the second rotatable coupling. As a result, a torque in the first direction is exerted on the first portion of the shaft by the second rotatable coupling, which in turn causes rotation of the shaft and the first rotatable coupling in the first direction. The spring opposes rotation of the first rotatable coupling in the first direction, such that the spring exerts a torque on the first rotatable coupling in a second direction, opposite to the first direction. Thus, the spring causes the first rotatable coupling to exert a torque in the second direction on the first portion of the shaft.

Accordingly, opposing torques may be exerted on the first and second portions of the shaft, due to the opposing torques applied by the rotary actuator and the spring. This causes the shaft to be rotationally locked (or wedged) between the first and second rotatable couplings, such that there may be no backlash in the rotational movement of the shaft. In particular, as long as the rotary actuator applies a torque that opposes the torque applied by the spring, backlash may be avoided. This may enable the rotational position of the shaft to be controlled with a high degree of accuracy and reproducibility. For example, this may enable fine adjustments to be reliably made to the rotational position shaft, thus improving an accuracy with which the mechanical device can be operated.

The second rotatable coupling may be spaced apart from the first rotatable coupling along the rotation axis. In other words, there may be a gap between the first rotatable coupling and the second rotatable coupling. This may serve to ensure that the first and second rotatable couplings are independently rotatable (when they are not engaged with the shaft), and avoid any direct transmission of torque between these parts. As an example, the gap may be less 1 mm or less, e.g. the gap may be about 1 mm, 0.8 mm, 0.6 mm, 0.4 mm, or 0.2 mm. Other sizes of gap between the first and second rotatable couplings are also possible.

In some cases the first rotatable coupling and the second rotatable coupling may be in contact with one another, e.g. an end of the first rotatable coupling may contact an end of the second rotatable coupling. In other words there may not necessarily be a gap between these parts. In such a case, the end of the first rotatable coupling may be slidable relative to the end of the second rotatable coupling, to enable rotation of the first and second rotatable couplings relative to one another.

In some embodiments, the spring return module may further comprise: a limiter element that is arranged to rotate with the first rotatable coupling; and one or more stopping surfaces comprising a first stopping surface arranged to abut a first limiter surface on the limiter element when the first rotatable coupling is in a first predetermined rotational position, to thereby limit rotation of the first rotatable coupling about the rotation axis in a second direction, the second direction being opposite to the first direction. Thus, when the first rotatable coupling is in the first predetermined rotational position, the first limiter surface abuts the first stopping surface, such that further rotation of the first rotatable coupling in the second direction is prevented. In this manner, the spring may be prevented from releasing all of its stored energy, and energy can remain safely stored in the spring when the first rotatable coupling is in the first predetermined rotational position. By limiting rotation of the first rotatable coupling in the second direction in this manner, it is possible to avoid a sudden release of all of the energy stored in the spring. For example, when the first rotatable coupling is allowed to rotate in the second direction (e.g. by switching off power to the rotary actuator), the first rotatable coupling may rotate until it reaches the predetermined rotational position to which rotation in the second direction is limited. In this manner, the first rotatable coupling is prevented from spinning until all of the energy in the spring is released. Instead, an amount of mechanical energy may remain stored in the spring, whilst preventing further release of energy from the spring.

This may also facilitate connecting the mechanical device to the coupling device. This is because the shaft of the mechanical device can be safely engaged with the first and second rotatable couplings whilst mechanical energy is stored in the spring, such that no further winding of the spring may be needed after these parts are engaged. As an example, prior to engaging the shaft of the mechanical device with the first and second rotatable couplings, the first rotatable coupling may be held in the first predetermined rotational position by action of the spring. The first portion of the shaft may then be engaged with the first rotatable coupling, e.g. by inserting shaft through the first rotatable coupling. The shaft may then further be inserted until it is engaged with the second rotatable coupling. In some cases, it may be necessary to rotate the second rotatable coupling (e.g. using the rotary actuator), in order to align the cross-sectional shapes of the second rotatable coupling and the second portion of the shaft so that they can be engaged. Use of the limiter element and stopping surfaces may further facilitate disengaging the mechanical device and rotary actuator from the coupling device, as they serve to avoid the sudden release of the spring's energy when the mechanical device and/or rotary actuator are disengaged from the coupling device.

The limiter element being arranged to rotate with the first rotatable coupling may mean that the limiter element is connected to or otherwise fixed relative to the first rotatable coupling, so that the limiter element and the first rotatable may rotate together as one. In some cases, the limiter element may be formed as part of the first rotatable coupling.

The first stopping surface may be arranged to abut (e.g. engage) the first limiter surface on the limiter element when the first rotatable coupling is in the first predetermined rotational position. The first stopping surface abutting against the first limiter surface may block further rotation of the first rotatable coupling in the second direction, i.e. the first rotatable coupling may be prevented by the first stopping surface from rotating further in the second direction. Thus, when the first rotatable coupling is in the first predetermined position, the torque exerted by the spring on the first rotatable coupling causes the first limiter surface to be pressed against the first stopping surface. As a result of the torque exerted by the spring on the first rotatable coupling, the first rotatable coupling may automatically return to the first predetermined rotational position when the first rotatable coupling is allowed to rotate under action of the spring. In particular, when the first rotatable coupling is rotated in the first direction (i.e. away from the first predetermined rotational position), energy is stored in the spring and the spring exerts a torque which urges the first rotatable coupling back towards the first predetermined rotational position.

The first predetermined rotational position of the first rotatable coupling may be defined by a position of the first stopping surface.

In some cases, the first predetermined rotational position may correspond to a predetermined state of the mechanical device. In this manner, the mechanical device may automatically be returned to the predetermined state (e.g. a closed state for a valve). Limiting rotation of the first rotatable coupling in the second direction to the first predetermined rotational position may further serve to protect the mechanical device, by preventing the first rotatable coupling from being rotated too far in the second direction (which might cause damage to the mechanical device).

The first stopping surface may, for example, be provided by a part of the retainer mentioned above, or by any other suitable part whose position is fixed relative to the retainer. More generally, each of the one or more stopping surfaces may be provided by a respective part of the retainer, or by a part that is fixed relative to the retainer.

The first stopping surface may have a shape that is complementary to a shape of the first limiter surface. This may ensure a good engagement between the first stopping surface and the first limiting surface, so that the first limiter surface can be effectively held against the first stopping surface.

The one or more stopping surface may further comprise a second stopping surface, the second stopping surface being arranged to abut a second limiter surface on the limiter element when the first stopping surface abuts the first limiter surface on the limiter element. In other words, the second stopping surface may abut the second limiter surface when the first rotatable coupling is in the first predetermined rotational position. Thus, the limiter element may include two limiter surfaces (the first and second limiter surfaces), which abut corresponding stopping surfaces when the first rotatable coupling is in the first predetermined rotational position. This may improve a stability with which the first rotatable coupling is held in the first predetermined rotational position, thus reducing a risk of sudden release of the spring's stored energy. In particular, providing pairs of surfaces which abut in this manner may reduce a risk of slippage between the surfaces when they abut one another.

The second stopping surface may have a shape that is complementary to a shape of the second limiter surface.

The limiter element may comprise a first arm on which the first limiter surface is disposed, and a second arm on which the second limiter surface is disposed. The limiter element may further comprise a central portion (e.g. a central plate), from which the first and second arms extend.

The first limiter surface and the second limiter surface may be arranged on opposite sides of the limiter element with respect to the rotation axis. In this manner, when the first rotatable coupling is in the first predetermined rotational position, the first rotatable coupling may be held (supported) in this position via the first and second limiter surfaces which are on opposite sides of the rotation axis. This may improve a stability with which the first rotatable coupling is held in the first predetermined rotational position. Correspondingly, the first stopping surface and the second stopping surface may be arranged on opposite sides of the retainer with respect to the rotation axis.

In some cases, the first limiter surface and the second limiter surface may be arranged such that they are substantially symmetrical about the rotation axis.

Where the limiter element includes first and second arms, the first arm and the second arm of the limiter element may extend respectively in opposing directions away from the rotation axis. In other words, the first arm and the second arm may be aligned along an axis that intersects the rotation axis, the first arm and second arm being disposed on opposite sides of the limiter element with respect to the rotation axis. In this manner, the first limiter surface and the second limiter surface may be arranged on opposite sides of the limiter element with respect to the axis of rotation.

The one or more stopping surfaces may further comprise a third stopping surface, the third stopping surface being arranged to abut a third limiter surface on the limiter element when the first rotatable coupling is in a second predetermined rotational position, to thereby limit rotation of the first rotatable coupling about the rotation axis in the first direction. Thus, when the first rotatable coupling is in the second predetermined rotational position, the third limiter surface may abut the third stopping surface, such that further rotation of the first rotatable coupling in the first direction is prevented. In this manner, the first rotatable coupling is prevented from being rotated in the first direction beyond the second predetermined rotational position. Thus, the first rotatable coupling may only be rotatable between the first predetermined rotational position and the second predetermined rotational position. In other words, a maximum angle of rotation of the first rotatable coupling relative to the retainer may correspond to an angular spacing between the first and second predetermined rotational positions.

This may serve to ensure that the first rotatable coupling is not rotated too far in the first direction, which might cause a large strain to be placed on the spring and/or retainer, as well as potentially cause damage to the mechanical device. This may also facilitate accurately moving the first rotatable coupling to the first and second predetermined rotational states.

The second predetermined rotational position of the first rotatable may be defined by a position of the third stopping surface.

In some cases, the first predetermined rotational position may correspond to a first predetermined state of the mechanical device, and the second predetermined rotational position may correspond to a second predetermined state of the mechanical device. For example, where the mechanical device is a valve, the first predetermined rotational position may correspond to a closed state of the valve and the second predetermined rotational position may correspond to an open state of the valve.

The third stopping surface may have a shape that is complementary to a shape of the third limiter surface.

The third limiter surface may be disposed on a same arm of the limiter element as the first limiter surface, e.g. the first and third limiter surfaces may be on opposite sides of the arm.

The first stopping surface and the third stopping surface may be arranged to limit a maximum angle of rotation of the first rotatable coupling about the rotation axis to an angle between 10°-140°. Such an angular range of motion may enable the coupling device to be used with a wide range of different mechanical devices, which may typically require an angle of travel in this range. For example a typical valve (such as a ball valve) may have an angle of about 90° between its open and closed states. So, for instance, the first stopping surface and the third stopping surface may be arranged to limit the maximum angle of rotation of the first rotatable coupling relative to the retainer to an angle of about 90° or more (e.g. 97°). In this manner, the coupling device may be effectively used with a typical valve such as a ball valve.

In a preferred example, the maximum angle of rotation of the first rotatable coupling relative to the retainer may be limited to an angle between 80°-110°.

However, the maximum angle of rotation of the first rotatable coupling relative to the retainer need not necessarily be limited to the ranges mentioned above, and can be adapted to the mechanical device with which the coupling device is used. For instance, the maximum angle of rotation of the first rotatable coupling about the rotation axis may be limited to an angle in one of the following ranges: 80°-110°, 10°-140°, 10°-180°, 10°-270°, 10°-300°.

In some cases, the first stopping surface and the third stopping surface may be arranged to enable rotation of the first rotatable coupling about the rotation axis through an angle near 360°, e.g. such that the first rotatable coupling may be rotated by nearly one full revolution. For example, the maximum angle of rotation of the first rotatable coupling relative to the retainer may be limited to an angle between 300°-360°. In some embodiments, such a large angle of rotation may be achieved by spacing two or more of the stopping surfaces in an axial direction, i.e. two or more of the stopping surfaces may be spaced apart along a direction parallel to the rotation axis. This may enable a limiter surface on the limiter element to pass under or over at least one of the stopping surfaces, thus enabling a greater range of rotation for the first rotatable coupling.

The one or more stopping surfaces may further comprise a fourth stopping surface, the fourth stopping surface being arranged to abut a fourth limiter surface on the limiter when the third stopping surface abuts the third limiter surface on the limiter element. In other words, the fourth stopping surface may abut the fourth limiter surface when the first rotatable coupling is in the second predetermined rotational position. Thus, the limiter element may include two limiter surfaces (the third and fourth limiter surfaces), which abut corresponding stopping surfaces when the first rotatable coupling is in the second predetermined rotational position. This may improve a stability with which the first rotatable coupling is held in the second predetermined rotational position, thus reducing a risk the first rotatable coupling accidentally being rotated beyond the second predetermined rotational position. In particular, providing pairs of surfaces which abut in this manner may reduce a risk of slippage between the surfaces when they abut one another.

The fourth stopping surface may have a shape that is complementary to a shape of the fourth limiter surface.

The third limiter surface and the fourth limiter surface may be arranged on opposite sides of the limiter element with respect to the rotation axis. In this manner, when the first rotatable coupling is in the second predetermined rotational position, the first rotatable coupling may be held (supported) in this position via the third and fourth limiter surfaces which are on opposite sides of the axis of rotation of the first rotatable coupling. This may improve a stability with which the first rotatable coupling is held in the second predetermined rotational position. Correspondingly, the third stopping surface and the fourth stopping surface may be arranged on opposite sides of the retainer with respect to the rotation axis.

Where the limiter element includes a first arm and a second arm, the third limiter surface may be disposed on the first arm of the limiter element, and the fourth limiter surface may be disposed on the second arm of the limiter element. This may provide a compact and sturdy construction for the limiter element. For example, the first limiter surface and the third limiter surface may be disposed on opposite sides of the first arm, and the second limiter surface and the fourth limiter surface may be disposed on opposite sides of the second arm.

The one or more stopping surfaces may be provided on one or more stopping elements which are removably mountable in the spring return module. In this manner, it may be possible to remove the one or more stopping elements, so that rotation of the first rotatable coupling about the rotation axis is no longer limited by the one or more stopping surfaces. For instance, after the shaft of the mechanical device is engaged with the first rotatable coupling and the second rotatable coupling, the one or more stopping elements may be removed to enable a greater range of rotation of the rotatable shaft. In order to subsequently disengage the mechanical device and/or the rotary actuator from the coupling device, the one or more stopping elements may be mounted in the spring return module. In this manner, the first rotatable coupling may be placed in the first predetermined rotational position (i.e. with the first stopping surface abutting the first limiter surface) before disengaging the mechanical device and/or rotary actuator from the coupling device, so that energy remains safely stored in the spring. Thus, the benefits of the spring return module discussed above in terms of improved safety and its ability to store spring energy may be achieved, whilst also enabling an increased rotational range of the first rotatable coupling. This may also enable the coupling device to be used with a wider range of mechanical devices, as a range of rotation of the first rotatable coupling need not necessarily be limited once the mechanical device and rotary actuator are connected to the coupling device.

Where the spring return module includes a retainer, the one or more stopping elements may be removably mountable in the retainer.

In some cases, a position of the one or more stopping surfaces in the spring return module may be adjustable. This may enable the first predetermined rotational position and/or the second predetermined rotational position to be adjusted. This may enable a maximum angle of rotation of the first rotatable coupling about the rotation axis to be adjusted. For instance, this may enable a user to adjust the maximum angle of rotation of the first rotatable coupling after the rotatable shaft has been engaged with the coupling device.

As an example, a position of the first stopping surface in the spring return module relative to the rotation axis may be adjustable, in order to adjust the first predetermined rotational position. The first stopping surface may be provided on a first stopping element which is movably mounted in the spring return module (e.g. in the retainer). Additionally or alternatively, a position of the third stopping surface in the spring return module relative to the rotation axis may be adjustable, in order to adjust the second predetermined rotational position. The third stopping surface may be provided on a second stopping element which is movably mounted in the spring return module (e.g. in the retainer). Any suitable mechanism may be used for movably mounting the first stopping element and/or the second stopping element in the spring return module.

The one or more stopping elements may comprise a first stopping element on which the first stopping surface is provided, and a second stopping element on which the second stopping surface is provided. The third stopping surface may be provided on the second stopping element, and the fourth stopping surface may be provided on the first stopping element. Thus, only a pair of stopping elements may be required to provide all four stopping surfaces. This may simplify a construction of the spring return module. As an example, the first stopping surface and the fourth stopping surface may be provided on opposite sides of the first stopping element, and the second stopping surface and third stopping surface may be provided on opposite sides of the second stopping element.

In some cases, the first and second stopping elements may be substantially symmetrical about the rotation axis. This may facilitate a construction of the spring return device, as well as improve a stability with which the first rotatable coupling can be held in the first and second predetermined rotational positions.

The one or more stopping elements may be removably mountable in the spring return module using any suitable means. For example, the one or more stopping elements may be removably mounted or secured to part of the spring return module, e.g. the retainer. In some cases, a releasable fastener (e.g. a bolt, screw, clamp or other) may be used to secure a stopping element in the spring return module. The spring return module (e.g. retainer) may include one or more mounting surfaces on which the one or more stopping elements are mounted.

Each of the one or more stopping elements may have a respective engagement portion which is engaged with a corresponding engagement portion in the spring return module (e.g. in the retainer). This may facilitate removably mounting the one or more stopping elements in the spring return module, and ensure that that the one or more stopping elements are accurately located relative to the first rotatable coupling, to ensure accurate positioning of the one or more stopping surfaces. The engagement portions on the stopping elements and the spring return module may have complementary shapes.

As an example, the engagement portion of each of the one or more stopping elements may be engaged in a respective slot in the spring return module (e.g. in the retainer).

The first rotatable coupling may comprise a first coupling part that is configured to engage the first portion of the shaft, the second rotatable coupling may comprise a second coupling part that is configured to engage the second portion of the shaft, and the first coupling part and the second coupling part may have a same cross-sectional shape. This may facilitate engaging the first and second portions of the shaft with the first and second rotatable couplings, respectively, e.g. as the second portion of the shaft may be inserted through the first coupling part to reach the second coupling part (or vice versa). The first and second portions of the shaft may thus have a same cross-sectional shape. When the first and second portions of the shaft are engaged with the first and second coupling parts, respectively, the cross-sectional shapes of the first and second coupling parts may therefore be aligned.

The second rotatable coupling may be configured to engage the second portion of the shaft and the output of the rotary actuator, respectively, on opposite sides of the second rotatable coupling. For example, the second coupling part and the third coupling part of the second rotatable coupling mentioned above may be located on opposite sides of the second rotatable coupling. Arranging the second rotatable coupling in this manner may facilitate transmission of torque from the rotary actuator to the shaft. Herein, opposite sides of the second rotatable coupling may refer to sides of the second rotatable coupling that face in opposite directions along the rotation axis.

In some embodiments, the spring return module may comprise a retainer that retains the spring, the first rotatable coupling being rotatable relative to the retainer about the rotation axis; the actuator coupling module comprises a housing, the second rotatable coupling being rotatable relative to the housing; and the housing and retainer are fixed relative to one another. In this manner, the coupling device may be provided as a single compact unit. This may facilitate connecting the coupling device between a mechanical device and a rotary actuator. The retainer may be as discussed above. The housing may include any suitable structure which is fixed relative to the retainer, and relative to which the second rotatable coupling is rotatably mountable. The housing and the retainer may be fixed (i.e. connected) together using any suitable fastening or attachment means. For example, the housing and retainer may be fixed together using one or more mechanical fasteners, such as bolts, screws, clamps, and/or and adhesive. In some cases, the retainer and the housing may be formed integrally as a single component.

The housing may comprise a mounting surface configured to receive the rotary actuator. In this manner, the rotary actuator may be mounted directly on the housing, such that the rotary actuator is fixed relative to the coupling device. This may enable effective transmission of torque about the rotation axis from the output of the rotary actuator to the second rotatable coupling. The mounting surface on the housing may include any suitable means for mounting the rotary actuator. For example, the mounting surface may comprise one or more holes, for bolting or screwing the rotary actuator to the mounting surface.

The spring return module (e.g. the retainer) may comprise a mounting surface configured to receive the mechanical device. Thus, the mechanical device may be mounted directly on the spring module, such that the mechanical device is fixed relative to the coupling device. This may enable effective transmission of torque about the rotation axis to the shaft of the mechanical device. The mounting surface on the spring return module may include any suitable means for mounting the mechanical device. For example, the mounting surface may comprise one or more holes, for bolting or screwing the mechanical device to the mounting surface.

According to a second aspect of the invention, there is provided an apparatus comprising: a mechanical device having a rotatable shaft; a rotary actuator; and a coupling device according to the first aspect of the invention; wherein a first portion of the shaft is engageable in the first rotatable coupling, and a second portion of the shaft is engageable in the second rotatable coupling; and wherein an output of the rotary actuator is engageable with the second rotatable coupling to apply a torque about the rotation axis to the second rotatable coupling. Any of the features discussed above in relation to the first aspect of the invention may be shared with the second aspect of the invention.

Thus, when the first portion of the shaft is engaged with the first rotatable coupling, the second portion of the shaft is engaged with the second rotatable coupling and the output of the rotary actuator is engaged with the second rotatable coupling, a torque exerted by the rotary actuator on the second rotatable coupling may cause rotation of the second rotatable coupling, the shaft and the first rotatable coupling about the rotation axis.

The first portion of the shaft and the first rotatable coupling are arranged (e.g. shaped) such that, when the first portion of the shaft is engaged with the first rotatable coupling, a torque applied to the shaft about the rotation axis is transmitted to the first rotatable coupling (and vice versa). Likewise, the second portion of the shaft and the second rotatable coupling are arranged (e.g. shaped) such that, when the second portion of the shaft is engaged with the second rotatable coupling, a torque applied to the second rotatable coupling about the rotation axis is transmitted to the shaft (and vice versa).

Additionally, the output of the rotary actuator and the second rotatable coupling are arranged (e.g. shaped) such that, when the output of the rotary actuator is engaged with the second rotatable coupling, the rotary actuator is operable to apply a torque to the second rotatable coupling about the rotation axis.

As discussed above in relation to the first aspect of the invention, in some cases, the second rotatable coupling may form part of the output of the rotary actuator. For example, the second rotatable coupling may correspond to an output shaft of the rotary actuator, which includes a coupling part for engaging the second portion of the shaft.

In an embodiment, the mechanical device may comprise a valve, wherein rotatable shaft is rotatable to actuate the valve between an open state and a closed state. In other embodiments, different types of mechanical devices may be used.

The rotary actuator may comprise a rotation limiter configured to limit rotation of the second rotatable coupling about the rotation axis to a predetermined angular range. This may serve to ensure that rotation of the shaft does not exceed the predetermined angular range, e.g. in order to avoid damage to the mechanical device. This may also serve to ensure the shaft is not rotated too far in the second direction, which could result in all of energy stored in the spring to be released. Thus, it may be possible to ensure that an amount of stored energy is kept in the spring, so that the rotary actuator can always work against a torque exerted by the spring. As explained above in relation to the first aspect of the invention, when the rotary actuator works against the torque exerted by the spring, backlash can be avoided when rotating the shaft.

The rotation limiter of the rotary actuator may be adjustable, in order to adjust the predetermined angular range.

The predetermined angular range of the rotary actuator may be adapted to the mechanical device, to ensure that the shaft can be rotated through a suitable angular range for operating the mechanical device. The rotation limiter may comprise any suitable means for limiting rotation of the second rotatable coupling about the rotation axis. As an example, some rotary actuators include an adjustable limiter screw (or screws), where the screw may be adjusted to adjust a maximum angle through which the output of the rotary actuator can be rotated.

When the first portion of the shaft is engaged with the first rotatable coupling, the second portion of the shaft is engaged with the second rotatable coupling, and the output of the rotary actuator is engaged with the second rotatable coupling, the predetermined angular range may be set such that the shaft is only rotatable in an angular range where the spring exerts a non-zero torque in a second direction on the first portion of the shaft, the second direction being opposite to the first direction. In this manner, the spring may continuously exert a torque in the second direction in the shaft, such that the rotary actuator can always work against the torque applied by the spring in order to rotate the shaft. As a result, it is possible to avoid any backlash when rotating the shaft, as opposing torques may be always be applied to the first and second portions of the shaft.

Where the spring return module includes a limiter element and one or more stopping surfaces, the rotation limiter may be configured to stop rotation of the second rotatable coupling about the rotation axis in the second direction before the first predetermined rotational position is reached. Thus, the rotation limiter may prevent the first rotatable coupling from returning to the first predetermined rotational position under action of the spring. As a result, when the apparatus is in use, the spring may always exert a non-zero torque in the second direction on the first rotatable coupling, and hence on the first portion of the shaft. Then, the rotary actuator may be operated such that the torque applied on the second portion of the shaft (via the second rotatable coupling) always opposes the torque applied by the spring on the first portion of the shaft. Additionally, using both the rotation limiter and the limiter element may improve a safety of the apparatus, as these provide a level of redundancy for limiting rotation of the rotatable shaft. In particular, this may ensure that rotation of the rotatable shaft in the second direction is limited and returned to a safe position, even in case of failure of one of the rotation limiter and limiter element.

As discussed above, in some cases, a position of the one or more stopping surfaces in the spring return module may be adjustable, in order to adjust the first and/or second predetermined rotational positions of the first rotatable coupling. The position of the one or more stopping surfaces may then be adjusted to ensure that the shaft is only rotatable in an angular range where the spring exerts a non-zero torque in the second direction on the first portion of the shaft. Thus, in such a case, it may not be necessary for the rotation limiter of the rotary actuator to be adjustable. For example, the position of the one or more stopping surfaces may be adjusted such that an angular offset between the first and second predetermined positions of the first rotatable coupling is greater than the predetermined angular range of the rotation limiter. In this manner, the rotation limiter may prevent the first rotatable coupling from returning all the way to the first predetermined rotational position under action of the spring.

BRIEF DESCRIPTION OF THE DRAWINGS

Embodiments of the present invention will now be discussed, by way of example only, with reference to the accompanying Figures, in which.

DETAILED DESCRIPTION; FURTHER OPTIONAL FEATURES

Figure 1:
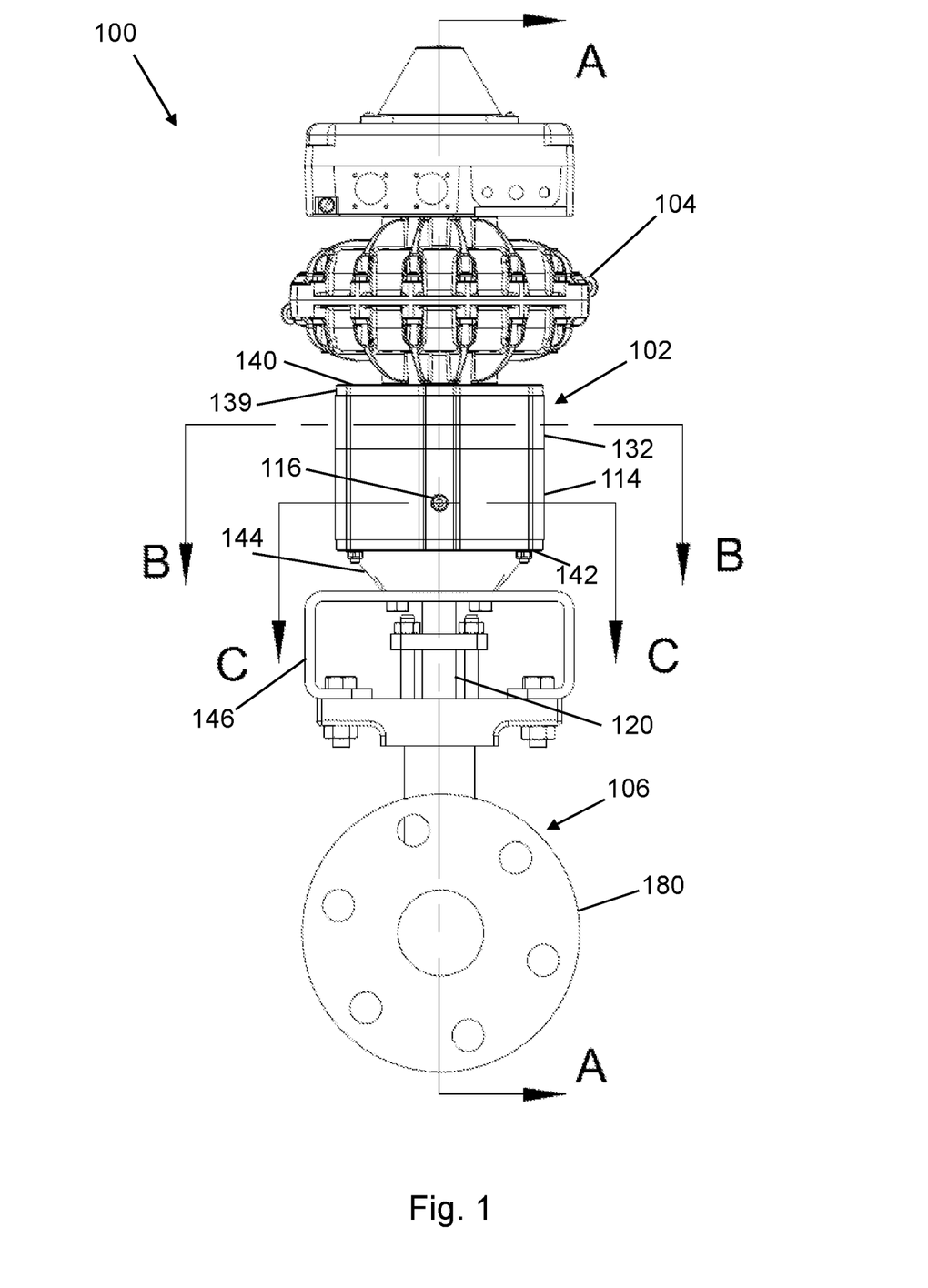
FIG. 1 is a schematic side view of an apparatus according to an embodiment of the invention.
Figure 2:
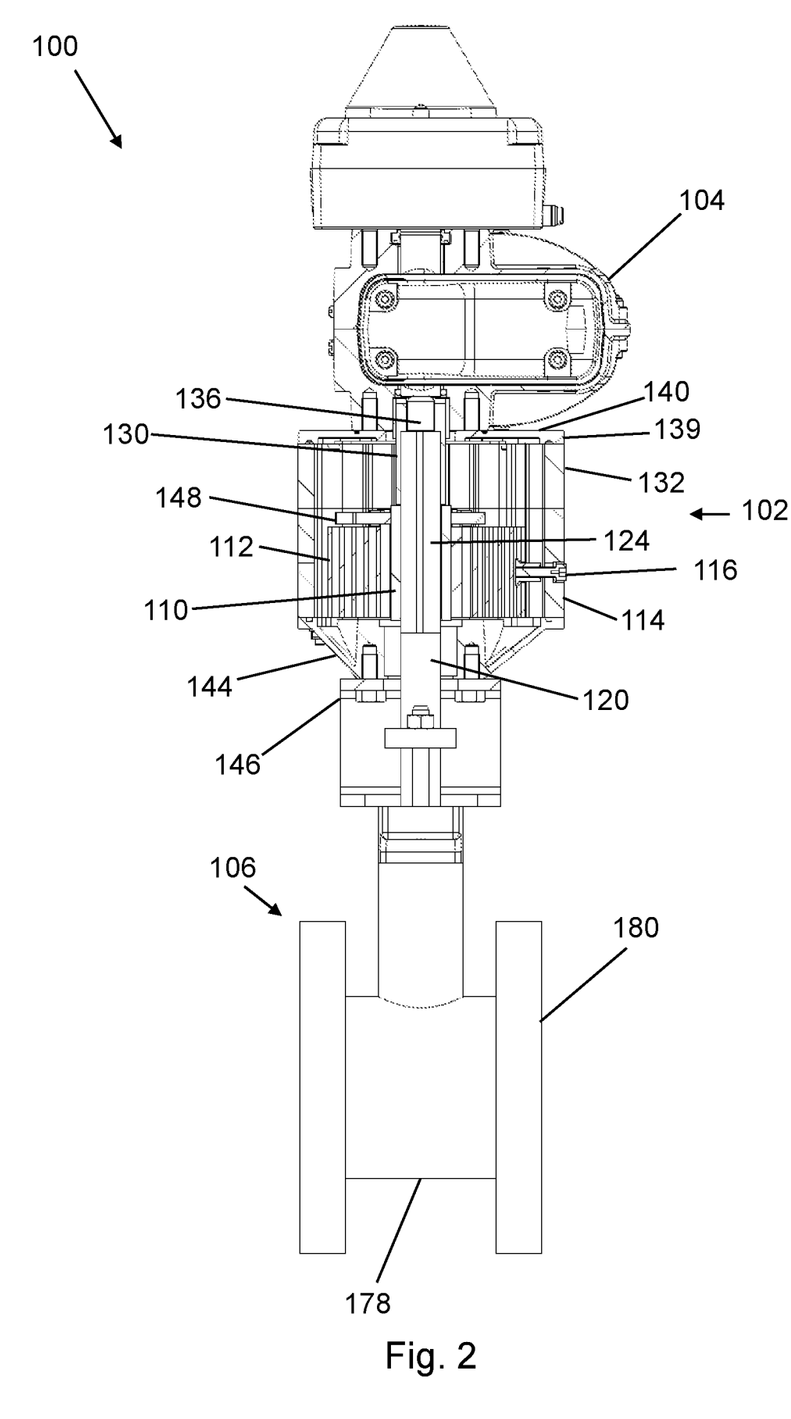
FIG. 2 is a schematic side cross-sectional view of the apparatus of FIG. 1.

FIG. 1 shows a schematic side view of an apparatus 100 according to an embodiment of the invention, whilst FIG. 2 shows a schematic cross-sectional view of the apparatus 100. The cross-sectional view of FIG. 2 corresponds to a cross-section of the apparatus taken along plane A-A indicated in FIG. 1. The apparatus 100 comprises a coupling device 102 according to an embodiment of the invention, a rotary actuator 104 and a mechanical device in the form of a valve 106. The rotary actuator 104 and the valve 106 are coupled together via the coupling device 102, such that the rotary actuator 104 can be operated to control opening and closing of the valve 106.

Figure 3:
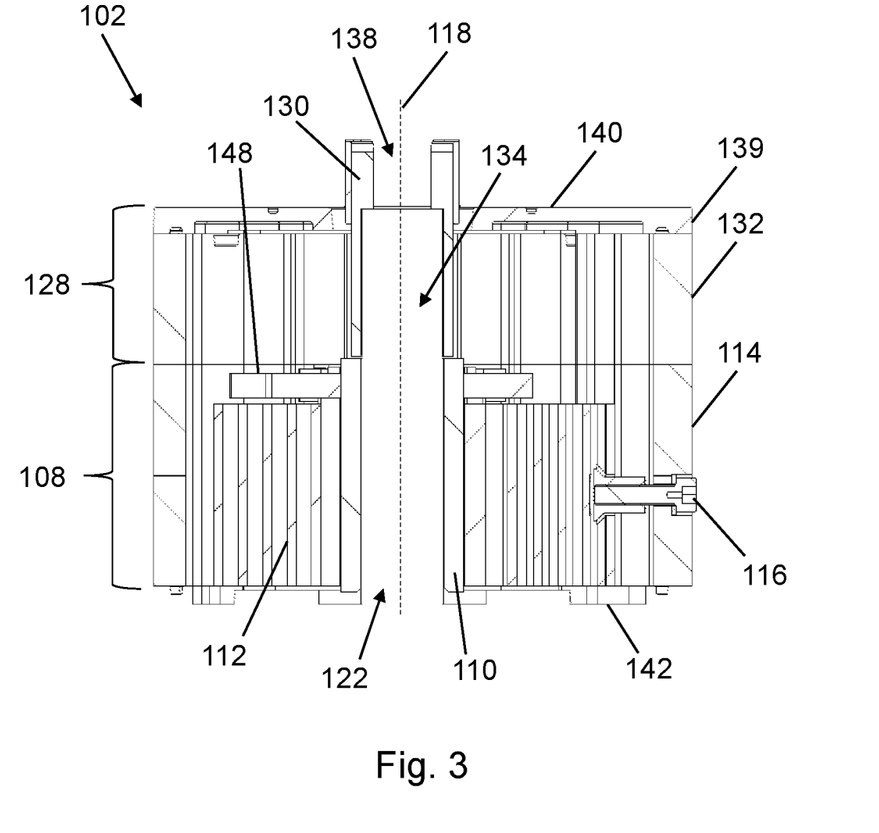
FIG. 3 is a schematic side cross-sectional view of a coupling device according to an embodiment of the invention.
Figure 4:
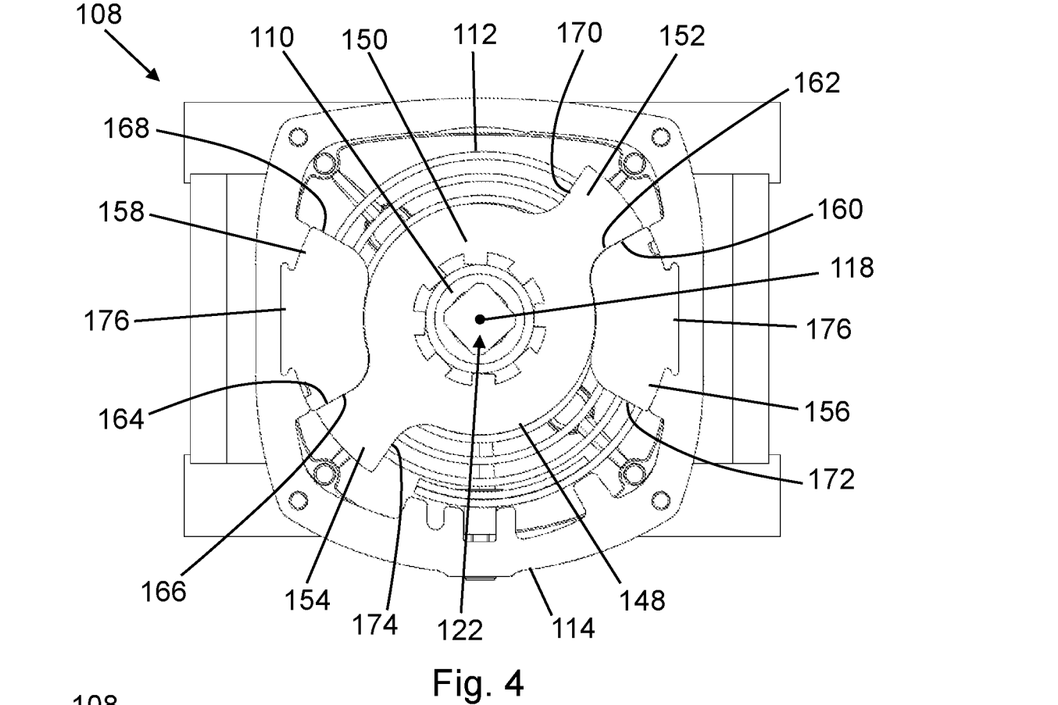
FIG. 4 is a schematic top view of the coupling device of FIG. 3, taken along a section B-B indicated in FIG. 1.

A cross-sectional view of the coupling device 102 on its own is shown in FIG. 3, the cross-sectional view of FIG. 3 corresponding to the plane A-A indicated in FIG. 1. The coupling device 102 includes a spring return module 108, which includes a first rotatable coupling 110 and a spring 112. The spring return module 108 further includes a retainer in the form of a spring housing 114, which houses the spring 112. The spring housing 114 is generally in the form of a ring or band of material that surrounds the spring 112. The spring housing 114 is substantially rigid, e.g. it cannot be easily deformed. The spring housing 114 may be made of metal and may be made by casting, for example. For example, the spring housing 114 may be cast as a single piece from metal. Alternatively, the spring housing 114 may be made of a plastic material, e.g. by moulding or 3D printing. The internal structure of the spring return module 108 is illustrated in more detail in FIGS. 4 and 5. FIG. 4 shows a top view of the spring return module 108 taken along section B-B indicated in FIG. 1, and FIG. 5 shows a top view of the spring return module 108 taken along section C-C indicated in FIG. 1.

Figure 5:
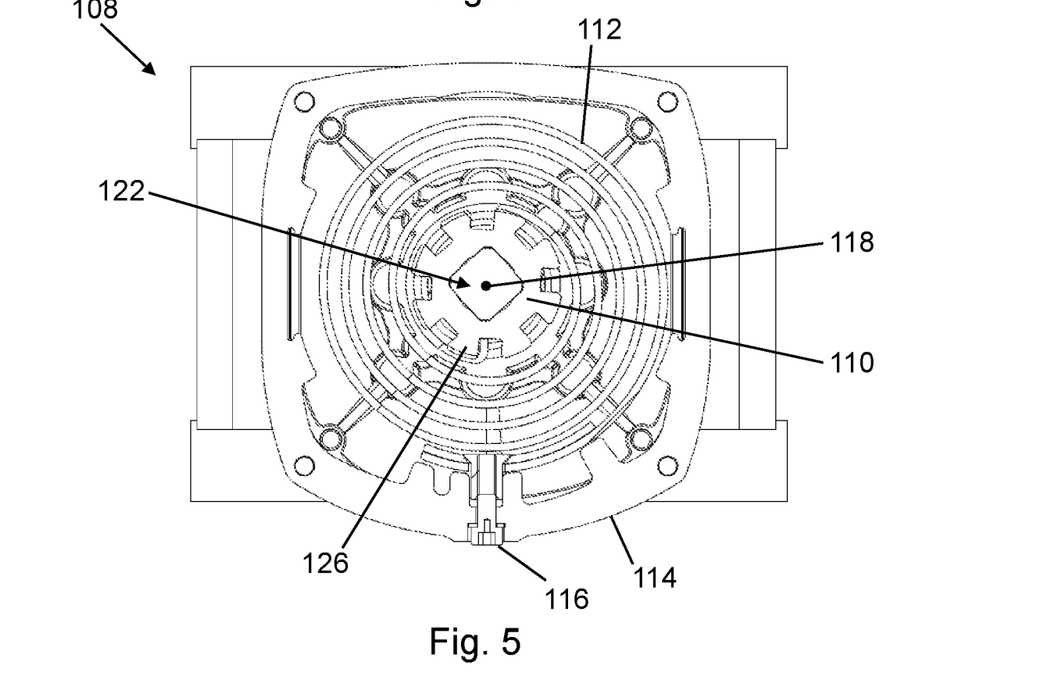
FIG. 5 is a schematic top view of the coupling device of FIG. 3, taken along a section C-C indicated in FIG. 1

The spring 112 is a clock-spring which is formed from a band of resilient metal that is wound into a spiral shape, as shown in FIGS. 4 and 5. An outer surface of the spring 112 is fixed to the spring housing 114 by a retaining screw 116, which extends through a threaded hole in the spring housing 114 from an outside thereof to an inside thereof, where it engages the spring 112. The retaining screw 116 can be adjusted from an outside of the spring housing 114, for example if a user wants to disengage the retaining screw 116 from the spring 112 to disassemble the coupling device 102.

The first rotatable coupling 110 is positioned at a centre of the spring housing 114. The first rotatable coupling 110 is rotatable relative to the spring housing 114, about a rotation axis corresponding to a central axis of the first rotatable coupling 110. In other words, the first rotatable coupling 110 can be rotated about is central axis while the spring housing 114 remains stationary. A location of the rotation axis (which corresponds to the central axis of the first rotatable coupling 110) is indicated by dashed line 118 in FIG. 3, and by point 118 in FIGS. 4 and 5. The rotation axis extends in a direction normal to the page in FIGS. 4 and 5.

The valve 106 includes a rotatable shaft 120, the shaft 120 being rotatable to operate the valve 106 (the shaft 120 of the valve 106 can be seen in FIG. 2). In particular, the shaft 120 may be rotated to control opening and closing of the valve 106. The shaft 120 includes a distal section (or length) 124 which is configured to extend into the coupling device 102, as discussed in more detail below. The distal section 124 of the shaft 120 has a non-circular cross-sectional shape, to facilitate transmission of torque to the shaft 120 about its longitudinal axis. In the example shown, the distal section 124 of the shaft 120 has a substantially square shape, however other non-circular shapes may also be used.

The first rotatable coupling 110 is configured to engage a first portion of the distal section 124 of rotatable shaft 120. Specifically, the first rotatable coupling 110 includes a first central channel 122 which is arranged to receive and engage the first portion of the shaft 120. The first channel 122 extends through the first rotatable coupling 110, and is open at both ends so that the shaft 120 can be inserted through the first channel 122. When the shaft 120 is engaged in the first channel 122, a longitudinal axis of the shaft 120 is aligned with the rotation axis 118. The first channel 122 has a cross-sectional shape that is adapted (e.g. complementary) to the cross-sectional shape of the first portion of the shaft 120. In this manner, when the first portion of the shaft 120 is engaged in the first channel 122, a torque applied to the first rotatable coupling 110 about the rotation axis 118 is transmitted to the first portion of the shaft 120 (and vice versa). Thus, the first rotatable coupling 110 and the shaft 120 may rotate together about the rotation axis 118. In the example shown, the first channel 122 has an approximately square shape, which is complementary to a corresponding square-shape of the distal section 124 of the shaft 120. Of course, in other examples, other shapes may be used for the first channel 122, depending on the cross-sectional shape of the shaft 120. In some cases, a size converter (or adapter) may be used in the first channel 122, for adapting a shape and size of the first channel 122 to the first portion of the shaft 120.

As shown in FIG. 5, the spring 112 is engaged with a side of the first rotatable coupling 110. Specifically, an end of the spring 112 is engaged with an engagement part 126 on the side of the first rotatable coupling 110 so that when the first rotatable coupling 110 is rotated in a first direction (e.g. anti-clockwise in the view of FIG. 5) the spring 112 is wound up within the spring housing 114 and stores mechanical energy. The engagement part 126 on the side of the first rotatable coupling 110 comprises a surface (e.g. a side or edge surface) of an indent or a protrusion on the side of the first rotatable coupling 110. In some embodiments, the engagement part may be a single-sided, one-way or one-direction engagement part that engages the end of the spring 112 in a single direction only, for example in the clockwise direction or in the anti-clockwise direction. For example, the engagement part may be a raised or recessed edge or wall for abutting an end of the clock-spring in the single direction. In other embodiments, the engagement part may be configured as a two-way engagement part that engages the end of the spring 112 in two directions, e.g. in the clockwise and anti-clockwise directions.

When wound up in this way (e.g. by rotating the first rotatable coupling 110 in the first direction), the spring 112 applies a torque to the drive coupling 110 in a second direction (clockwise view of FIG. 5) that acts to rotate the first rotatable coupling 110 in the second direction (unless this torque is balanced by a corresponding torque in the first direction). The spring 112 therefore acts to resist rotation of the first rotatable coupling 110 in the first direction. Accordingly, when the first portion of the shaft 120 is engaged in the first channel 122, the spring 112 may exert a torque on the first portion of the shaft (via the first rotatable coupling 110), which opposes rotation of the shaft 120 in the first direction.

The coupling device 102 further includes an actuator coupling module 128 which is configured to couple the shaft 120 of the valve 106 to the rotary actuator 104. The actuator coupling module 128 comprises a second rotatable coupling 130, and a housing 132. The housing 132 is fixed relative to the spring housing 114 of the spring return module 108, e.g. using suitable fixing means such as bolts, screws, and/or an adhesive. The housing 132 may be made of a similar material to the spring housing 114. In some cases, the housing 132 and the spring housing 114 may be formed integrally as a single component.

The second rotatable coupling 130 is mounted so that it is rotatable relative to the housing 132 about the rotation axis 118, i.e. it is rotatable about the same rotation axis as the first rotatable coupling 110. The second rotatable coupling 130 is configured to engage a second portion of the distal portion 124 shaft 120. In particular, the second rotatable coupling 130 includes a second central channel 134, which is arranged to receive and engage the second portion of the shaft 120. The second channel 134 is open at one end for receiving the second portion of the shaft 120. The second portion of the shaft 120 corresponds to a distal end of the shaft 120 that protrudes from the first channel 122 when the first portion of the shaft 120 is engaged in the first channel 122. The first and second rotatable couplings 110, 130 are arranged such that the first and second channels 122, 134 are centred about the rotation axis 118, and are adjacent to (or spaced apart from) one another along the rotation axis 118. The second channel 134 has a cross-sectional shape that is adapted (e.g. complementary) to the cross-sectional shape of the second portion of the shaft 120. In this manner, when the second portion of the shaft 120 is engaged in the second channel 134, a torque applied to the second rotatable coupling 130 about the rotation axis 118 is transmitted to the second portion of the shaft 120 (and vice versa). Thus, the second rotatable coupling 130 and the shaft 120 may rotate together about the rotation axis 118. In the example shown, the second channel 134 has the same shape as the first channel 122, i.e. an approximately square shape, to match the square-shaped distal section 124 of the shaft 120. In some cases, the first and second portions of the shaft 120 may have different cross-sectional shapes, in which case the first and second channels 122, 134 may have different cross-sectional shapes. In some cases, a size converter (or adapter) may be used in the second channel 134, for adapting a shape and size of the second channel 134 to the second portion of the shaft 120.

The second rotatable coupling 130 is further configured to engage an output shaft 136 of the rotary actuator 104 (the output shaft 136 can be seen in FIG. 2). In particular, the second rotatable coupling 130 includes a bore 138 for receiving and engaging the output shaft 136 of the rotary actuator 104. The bore 138 may also be referred to as a third channel. The bore 138 is arranged on an opposite side of the second rotatable coupling 130 compared to the second channel 134. In other words, an opening of the bore 138 and an opening of the second channel 134 face in opposite directions along the rotation axis 118. The bore 138 has a shape that is complementary to a shape of the output shaft 136 of the rotary actuator 104, so that the output shaft 136 can apply a torque to the second rotatable coupling 130 about the rotation axis 118. Typically, the rotary actuator 104 may have a square-shaped output shaft 136, however other shapes are also possible. Thus, when the output shaft 136 of the rotary actuator 104 is engaged in the bore 138, the rotary actuator 104 can apply a torque to the second rotatable coupling 130 to cause rotation of the second rotatable coupling about the rotation axis 118. Note that, although in the example shown the second rotatable coupling 130 is separate from the output shaft 136 of the rotary actuator 104, in some cases, the second rotatable coupling 130 may be formed as part of the output shaft 136. For example, the rotary actuator 104 may include an output shaft in which the second channel 134 is formed.

The first rotatable coupling 110 and the second rotatable coupling 130 are rotatable relative to one another about the rotation axis 118, when the shaft 120 is not engaged in the coupling device 102. In other words, when the shaft 120 is not engaged in the coupling device 102, the first and second rotatable couplings 110, 130 are not rotationally coupled to one another, such that they can be rotated independently about the rotation axis 118. Thus, there may be no direct connection between the first and second rotatable couplings 110, 130. In some cases, this may be achieved by spacing the second rotatable coupling 130 apart from the first rotatable coupling 110 along the rotation axis 118, such that there is a gap between these parts.

The housing 132 includes a first mounting surface 140 on which the rotary actuator 104 is mountable. The first mounting surface 140 may be provided, for example, by a top pate 139 of the housing 132. The first mounting surface 140 may include any suitable means for mounting the rotary actuator 104, e.g. the first mounting surface 140 may include one or more holes for bolting or screwing the rotary actuator 104 to the first mounting surface 140. This may ensure that the rotary actuator 104 remains fixed relative to the coupling device 102, so as to enable effective transmission of torque from the rotary actuator to the shaft 120 of the valve 106. When the rotary actuator 104 is mounted on the first mounting surface 140 (e.g. as shown in FIGS. 1 and 2), the output shaft 136 of the rotary actuator 104 is engaged in the bore 138, so that the rotary actuator 104 can cause rotation of the second rotatable coupling about the rotation axis 118.

In some cases, the second rotatable coupling 130 may be mounted in the housing 132 via a rotatable connection, to enable rotation of the second rotatable coupling 130 relative to the housing 132. For example, the top plate 139 may include a rotatable bearing for rotatably mounting the second rotatable coupling 130. However, there need not necessarily be a direct connection between the second rotatable coupling 130 and the housing 132, with the second rotatable coupling being connected in used between the shaft 120 and the output shaft 136 of the rotary actuator 104 (the rotary actuator 104 itself being fixed relative to the housing 132). In such a case, the top plate 139 may include an aperture through which the second rotatable coupling 130 protrudes in use.

A second mounting surface 142 is provided on the spring return module 108, for securing the valve 106 to the spring return module 108. The second mounting surface 142 may be formed, for example, by part of the spring housing 114. The first and second mounting surfaces 140, 142 are located on opposite sides of the coupling device 102, such that the first and second mounting surfaces 140, 142 face in opposite directions along the rotation axis 118. The second mounting surface 142 may include any suitable means for mounting to the valve 106. For example, the second mounting surface 142 may include one or more holes for bolting the valve 106 to the second mounting surface 142. In the example shown in FIGS. 1 and 2, a first mounting flange 144 is mounted to the second mounting surface 142 (e.g. via one or more screws), with a corresponding second mounting flange 146 of the valve 106 being bolted to the first mounting flange 144. Of course, in other examples, different arrangements may be used for securing the valve 106 to the coupling device 102. Fixing the valve 106 to the coupling device 102 may serve to ensure that a torque can effectively be applied to the shaft 120, e.g. to cause rotation of the shaft about the rotation axis 118.

When the coupling device 102 is in use (e.g. as shown in FIGS. 1 and 2), the distal section 124 of the shaft 120 extends into the coupling device 102, with the first portion of the shaft 120 being engaged with the first rotatable coupling 110 and the second portion of the shaft 120 being engaged with the second rotatable coupling 130. Additionally, the output shaft 136 of the rotary actuator 104 is engaged in the bore 138 of the second rotatable coupling 130. Thus, the rotary actuator 104 may be controlled to apply a torque in the first direction (e.g. corresponding to the anti-clockwise direction in the views of FIGS. 4 and 5) to the second rotatable coupling 130, resulting in a torque in the first direction being applied to the second portion of the shaft 120. In response, the spring 112 exerts a torque in the second direction (e.g. corresponding to the clockwise direction in the views of FIGS. 4 and 5) on the first portion of the shaft 120, via the first rotatable coupling 110. Accordingly, opposing torques are applied to the first and second portions of the shaft 120. Because of this, the shaft 120 is rotationally locked to the second rotatable coupling 130, such that there may be zero or only minimal backlash between the shaft 120 and the second rotatable coupling 130. In particular, as long as the torque applied by the rotary actuator 104 to the second portion of the shaft 120 opposes the torque exerted by the spring 112 on the first portion of the shaft 120, backlash may be avoided, thus enabling smooth and accurate rotation of the shaft 120 about the rotation axis 118.

In order to rotate the shaft 120 in the first direction, the rotary actuator 104 may be controlled to apply a torque in the first direction that overcomes (i.e. exceeds) the torque exerted by the spring on the second portion of the shaft 120. As an example, the shaft 120 may be rotated in the first direction to move the valve from a first state (e.g. a closed state) to a second state (e.g. an open state). To maintain the valve 106 in the second state, the rotary actuator 104 must apply a torque that balances the torque exerted by the spring 112 on the first portion of the shaft 120. To return the valve 106 to the first state from the second state, the torque applied by the rotary actuator 104 in the first direction may be reduced so that it is less than the torque exerted by the spring 112 on the first portion of the shaft 120 (the torque applied by the rotary actuator 104 being greater than zero), so that the valve 106 returns to the first state under action of the spring 112. Thus, the rotary actuator 104 can be controlled to apply a torque that opposes the torque exerted by the spring 112 when the shaft is rotated in both directions. In this manner, smooth and accurate control of rotation of the shaft 120 in both the first and second directions may be achieved. In particular, this may enable the shaft 120 to be reliably and reproducibly rotated through small angles, thus enabling fine adjustments to the state of the valve.

If power to the rotary actuator 104 is suddenly cut off during operation of the apparatus 100, the shaft 120 may be rotated in the second direction under action of the spring 112, such that the valve 106 is automatically returned to the first state. Thus, the spring return module 108 may act as a fail-safe, for automatically returning the valve 106 to the first state in case of a loss of power to the rotary actuator 104.

The spring module 108 may further include a limiter element 148 (shown in FIG. 4) which is connected to the first rotatable coupling 110 and arranged to rotate with the first rotatable coupling 110. In other words, the first rotatable coupling 110 and limiter element 148 rotate together as one. In some embodiments, the limiter element 148 may be formed integrally with the first rotatable coupling 110, i.e. the limiter element 148 and the first rotatable coupling 110 may be formed as a single component. For example, the first rotatable coupling 110 and limiter element 148 may be cast or moulded as a single piece of metal. Alternatively, the limiter element 148 may be formed separately from the first rotatable coupling 110, and secured to the first rotatable coupling 110 via any suitable means (e.g. with an adhesive, mechanical fastener, or a soldered or welded joint).

The limiter element 148 comprises a central plate 150 which is disposed around the first rotatable coupling 110 and connected to the first rotatable coupling 110. As shown in FIG. 4, the central plate 150 may have a substantially circular shape which is centred about the rotation axis 118 of the first rotatable coupling 110. Additionally, the limiter element 148 comprises a first arm 152 and a second arm 154 which extend outwards from the central plate 150. The first arm 152 and second arm 154 extend in a plane that is substantially perpendicular to the rotation axis 118. The first arm 152 and second arm 154 extend from diametrically opposite sides of the central plate 150, and are arranged such that they are substantially symmetrical about the rotation axis 118. The first arm 152 and second arm 152 may both have "dovetail" shapes, as shown in FIG. 4, i.e. a width of the first and second arms may increase away from the central plate 150.

A first stopping element 156 and a second stopping element 158 are mounted in the spring housing 114, and arranged to limit a range of rotation of the first rotatable coupling 110 about the rotation axis 118. In particular, the first stopping element 156 has a first stopping surface 160 which is arranged to abut a first limiter surface 162 on the first arm 152 of the limiter element 148 when the first rotatable coupling 110 is in a first predetermined rotational position, to thereby limit rotation of the drive coupling in the second direction (i.e. the clockwise direction in FIG. 4). Additionally, the second stopping element 158 has a second stopping surface 164 arranged to abut a second limiter surface 166 on the second arm 154 of the limiter element 148 when the first rotatable coupling 110 is in the first predetermined rotational position. FIG. 4 illustrates a configuration of the spring return module 108 where the first rotatable coupling 110 is in the first predetermined rotational position: as can be seen, the first stopping surface 160 abuts the first limiter surface 162 and the second stopping surface 164 abuts the second limiter surface 166.

Due to the abutment between the stopping surfaces and the limiter surfaces when the first rotatable coupling 110 is in the first predetermined rotational position, the first rotatable coupling 110 is prevented for rotating further in the second direction. This prevents the first rotatable coupling 110 from freely rotating in the second direction under action of the spring 112, which could result in the spring 112 completely unwinding and releasing all of its stored energy. Accordingly, when no torque is provided to the first rotatable coupling 110 in order to overcome the torque exerted by the spring 112, the torque from the spring 112 causes the first rotatable coupling 110 to be held in the first predetermined rotational position. Thus, energy may remain stored in the spring 112, without a risk sudden release of the energy stored in the spring 112. This may facilitate engaging and disengaging the shaft 120 in the coupling device 102. Furthermore, by providing a pair of stopping surfaces (i.e. the first and second stopping surfaces) which abut a corresponding pair of limiter surfaces (i.e. the first and second limiter surfaces) to hold the drive coupling in the first predetermined rotational position, a stability with which the first rotatable coupling 110 is held in the first predetermined rotational position may be improved. As the first and second arms of the limiter element 148 extend from diametrically opposite sides of the central plate 150, first limiter surface 162 and the second limiter surface 166 may act to hold the first rotatable coupling 110 in the first predetermined position at diametrically opposite points about the rotation axis 118, which may further improve the stability with which it can be held in the first predetermined rotational position.

The second stopping element 158 further includes a third stopping surface 168 which is arranged to abut a third limiter surface 170 on the first arm 152 of the limiter element 148 when the first rotatable coupling 110 is in a second predetermined rotational position, to thereby limit rotation of the first rotatable coupling in the first direction (i.e. the anticlockwise direction in FIG. 4). The first stopping element 156 also has a fourth stopping surface 172 arranged to abut a fourth limiter surface 174 on the second arm 154 of the limiter element 148 when the first rotatable coupling 110 is in the second predetermined rotational position. Thus, when a torque is applied to the first rotatable coupling 110 to overcome the torque from the spring 112, the first rotatable coupling 110 may be rotated in the first direction until it reaches the second predetermined position, where the third stopping surface 168 abuts the third limiter surface 170 and the fourth stopping surface 172 abuts the fourth limiter surface 174. This prevents rotation of the first rotatable coupling 110 in the first direction beyond the second predetermined rotational position. This may serve to prevent the spring 112 from being wound up too tightly, which could result in damage to the spring return module 108. This may also serve to protect the valve 106 when it is engaged with the coupling device 102, e.g. by ensuring that the first rotatable coupling 110 is not rotated beyond an operational range of the valve 106.

Accordingly, the first rotatable coupling 110 may be rotated between the first and second predetermined rotational positions, i.e. the first rotatable coupling 110 can be rotated through an angle corresponding to an angular offset between the first and second predetermined rotational positions. The positions and shapes of the first and second stopping elements 156, 158, as well as the geometry of the first and second arms 152, 154 of the limiter element 148, may serve to define the first and second predetermined rotational positions. In the example shown in FIG. 4, an angular offset of the first and second predetermined rotational positions is approximately 97°, i.e. the first rotatable coupling 110 can about the rotation axis 118 by a maximum angle of approximately 97°. More generally, the first and second predetermined rotational positions may be defined such that a maximum angle of rotation of the first rotatable coupling 110 about the rotation axis 118 is adapted to the valve 106 (or any other mechanical device with which the coupling device 102 is used). For example, the maximum angle of rotation of the first rotatable coupling 110 about the rotation axis 118 may be limited to an angle that is in a range of 10°-140°. Such an angular range of motion may enable the coupling device 102 to be used with a wide range of different mechanical devices, which may typically require an angle of travel in this range. Similarly to the discussion above in relation to the first predetermined rotational position, the arrangement of the third and fourth limiter surfaces on the first and second arms of the limiter element 148 may serve to improve a stability with which the first rotatable coupling 110 can be held in the second predetermined rotational position.

It should be noted that, in different embodiments, different arrangements of the limiter element 148 and of the stopping elements may be used, in order to limit rotation of the first rotatable coupling 110 relative to the spring housing 114. For example, more or fewer stopping elements may be used, with the limiter element 148 being adapted accordingly.

Prior to connecting the coupling device 102 between the rotary actuator 104 and the valve 106, the first rotatable coupling 110 may be held in the first rotational position (shown in FIG. 4), under action of the spring 112. In order to connect the coupling device 102 between the rotary actuator 104 and the valve 106, the rotary actuator 104 may first be mounted on the first mounting surface 140, such that the output shaft 136 of the rotary actuator 104 is engaged in the bore 138. The rotary actuator 104 may then be controlled to rotate the second rotatable coupling 130, in order to align the cross-sectional shapes of the first channel 122 and the second channel 134. Once the first and second channels 122, 134 are aligned, the distal section 124 of the shaft 120 may be inserted through the first channel 122, until the first section of the shaft 120 is engaged in the first channel 122 and the second section of the shaft 120 is engaged in the second channel 134. Finally, the valve 106 may be secured to the second mounting surface 142, e.g. using the first and second mounting flanges 144, 146 mentioned above. Then, the actuator 104 may be operated as discussed above, to control rotation of the shaft 120.

In some cases, the rotary actuator 104 may include a rotation limiter, which is configured to limit rotation of the output shaft 136 to a predetermined angular range. This may serve to ensure that the shaft 120 is not rotated beyond an operational limit of the valve 106, which might damage the valve 106. The rotation limiter may be adjustable, so that the predetermined angular range can be adjusted by a user. For example, the rotary actuator 104 may include end stop (or travel stop) screws, which are configured to limit rotation of the output shaft 136, and which are adjustable in order to adjust the predetermined angular range. In this manner, the predetermined angular range can be set to suit various operational requirements. As an example, the rotation limiter of the rotary actuator 104 may limit rotation of the output shaft 136 to a range between 80° to 100°.

The rotation limiter of the rotary actuator 104 may be set so that the rotary actuator 104 is configured to only apply a torque that opposes the torque exerted by the spring 112. This may ensure that opposing torques are always exerted on the first and second portions of the shaft 120. This may be achieved by setting the predetermined angular range such that the shaft 120 is only rotatable in an angular range where the spring 112 exerts a non-zero torque in the second direction on the first portion of the shaft 120. In practice, this may be done by setting the rotation limiter such that it is configured to stop rotation of the output shaft 136 (and hence of the first and second rotatable couplings 110, 130 and of the shaft 120) in the second direction before the first rotatable coupling 110 reaches the first predetermined rotational position. To set the rotation limiter in this manner, the coupling device 102 may be connected between the rotary actuator 104 and the valve 106 as discussed above, such that the first rotatable coupling 110 is initially in the first predetermined rotational position. Then, the rotary actuator 104 may be operated to rotate the first rotatable coupling 110 in the first direction away from the first predetermined rotational position. With the first rotatable coupling 110 rotated away from the first predetermined rotational position, the rotation limiter of the rotary actuator 104 may then be set, to prevent the first rotatable coupling from returning all the way to the first predetermined rotational position. In this manner, the spring 112 may continuously exert a torque in the second direction on the first portion of the shaft 120.

More generally, the rotation limiter of the rotary actuator 104 may be set such that the predetermined angular range of the output shaft 136 is smaller than the angular offset of the first and second predetermined rotational positions of the first rotatable coupling 110. In this manner, the rotation limiter in the rotary actuator 104 may act to prevent the first rotatable coupling 110 from reaching either of the first and second predetermined rotational positions, so that the spring continuously exerts a torque in the second direction on the first portion of the shaft 120. As an example, where the angular offset of the first and second predetermined rotational positions is 97°, the rotation limiter of the rotary actuator may limit rotation of the output shaft 136 to a range between 90° and 92°.

In some embodiments, the first stopping element 156 and the second stopping element 158 may each be removably mounted in the spring housing 114. In this manner, they can be removed from the spring housing 114, so that they no longer limit rotation of the first rotatable coupling 110. For example, following the engagement of the shaft 120 in the coupling device 102, the first and second stopping elements 156, 158 may be removed to enable a wider range of rotation for the first rotatable coupling 110. More specifically, each of the first and second stopping elements 156, 158 includes a respective engagement portion 176 which is engaged in a corresponding slot formed in a side of the spring housing 114. The engagement portion 176 has a shape that is complementary to a shape of the slot, to ensure accurate location of the stopping elements in the spring housing 114. Additionally, each of the first and second stopping elements 156, 158 may be held in the slot by means of a respective retaining screw (not shown) which passes through part of the spring housing 114. To remove the stopping elements 156, 158, the retaining screws may be removed so that they can be slid out of their slots. Of course, other means for removably mounting the stopping elements to the spring housing 114 may be used. In some embodiments the first and second stopping elements 156, 158 may be formed as part of the spring housing 114, i.e. they may not be removable from the spring housing 114.

In the example shown in FIGS. 1 and 2, the coupling device 102 is used with valve 106. The valve 106 may include any suitable type of valve, such as a ball valve. The valve 106 includes a length of pipe 178 with connection flanges 180 arranged on either side thereof, for connecting the valve in a pipe network. As mentioned above, the valve 106 is operable by means of the rotatable shaft 120, to control opening and closing of the valve 106 so that a fluid flow through the pipe 178 can be controlled. However, in other examples of apparatus 100, other types of mechanical device (i.e. other than valve 106). Indeed, the coupling device 102 may be used with any mechanical device having a rotatable shaft. The rotary actuator 104 may be any suitable type of rotary actuator, such as a pneumatic rotary actuator, an electrical rotary actuator, a hydraulic rotary actuator, a stepper motor, or a servomotor.

The invention claimed is:

1. A coupling device for coupling a rotary actuator to a mechanical device having a rotatable shaft, wherein the rotatable shaft is rotatable to control an operational state of the mechanical device, the coupling device comprising:
   a spring return module, the spring return module comprising:
      a first rotatable coupling configured to engage a first portion of the rotatable shaft;
      a spring engaged with the first rotatable coupling, wherein the first rotatable coupling is rotatable about a rotation axis, and wherein rotation of the first rotatable coupling about the rotation axis in a first direction causes mechanical energy to be stored in the spring; and
   an actuator coupling module comprising a second rotatable coupling,
   wherein the second rotatable coupling comprises a channel configured to receive and engage a second, distal end portion of the rotatable shaft, the second rotatable coupling having a further coupling part configured to engage an output of the rotary actuator, wherein the channel and the further coupling part are arranged on opposite sides of the second rotatable coupling, and
   wherein the second rotatable coupling is rotatable about the rotation axis, the second rotatable coupling being rotatable relative to the first rotatable coupling about the rotation axis.

2. The coupling device according to claim 1, wherein the second rotatable coupling is spaced apart from the first rotatable coupling along the rotation axis.

3. The coupling device according to claim 1, wherein the spring return module further comprises:
   a limiter element that is arranged to rotate with the first rotatable coupling; and
   one or more stopping surfaces comprising a first stopping surface arranged to abut a first limiter surface on the limiter element when the first rotatable coupling is in a first predetermined rotational position, to thereby limit rotation of the first rotatable coupling about the rotation axis in a second direction, the second direction being opposite to the first direction.

4. The coupling device according to claim 3, wherein the one or more stopping surfaces further comprises a second stopping surface, the second stopping surface being arranged to abut a second limiter surface on the limiter element when the first stopping surface abuts the first limiter surface on the limiter element.

5. The coupling device according to claim 3, wherein the one or more stopping surfaces further comprises a third stopping surface, the third stopping surface being arranged to abut a third limiter surface on the limiter element when the first rotatable coupling is in a second predetermined rotational position, to thereby limit rotation of the first rotatable coupling about the rotation axis in the first direction.

6. The coupling device according to claim 5, wherein the first stopping surface and the third stopping surface are arranged to limit a maximum angle of rotation of the first rotatable coupling about the rotation axis to an angle between 10°-140°.

7. The coupling device according to claim 3, wherein the one or more stopping surfaces are provided on one or more stopping elements which are removably mountable in the spring return module.

8. The coupling device according to claim 1, wherein the first rotatable coupling comprises a first coupling part that is configured to engage the first portion of the rotatable shaft, and wherein the first coupling part and the channel in the second rotatable coupling have a same cross-sectional shape.

9. The coupling device according to claim 1, wherein:
the spring return module comprises a retainer that retains the spring, the first rotatable coupling being rotatable relative to the retainer about the rotation axis;
the actuator coupling module comprises a housing, the second rotatable coupling being rotatable relative to the housing; and
the housing and retainer are fixed relative to one another.

10. The coupling device according to claim 9, wherein the housing comprises a mounting surface configured to receive the rotary actuator.

11. An apparatus comprising:
a mechanical device having a rotatable shaft;
a rotary actuator; and
a coupling device for coupling the rotary actuator to the mechanical device having a rotatable shaft wherein the rotatable shaft is rotatable to control an operational state of the mechanical device, the coupling device comprising:
a spring return module, the spring return module comprising:
a first rotatable coupling configured to engage a first portion of the rotatable shaft;
a spring engaged with the first rotatable coupling, wherein the first rotatable coupling is rotatable about a rotation axis, and wherein rotation of the first rotatable coupling about the rotation axis in a first direction causes mechanical energy to be stored in the spring; and
an actuator coupling module comprising a second rotatable coupling, wherein the second rotatable coupling comprises a channel configured to receive and engage a second, distal end portion of the shaft, the second rotatable coupling having a further coupling part configured to engage an output of the rotary actuator, wherein the channel and the further coupling part are arranged on opposite sides of the second rotatable coupling; and
wherein the second rotatable coupling is rotatable about the rotation axis, the second rotatable coupling being rotatable relative to the first rotatable coupling about the rotation axis;
wherein the first portion of the rotatable shaft is engageable in the first rotatable coupling, and the second portion of the rotatable shaft is engageable in the second rotatable coupling; and
wherein the output of the rotary actuator is engageable with the second rotatable coupling to apply a torque about the rotation axis to the second rotatable coupling.

12. The apparatus according to claim 11, wherein the rotary actuator comprises a rotation limiter configured to limit rotation of the second rotatable coupling about the rotation axis to a predetermined angular range.

13. The apparatus according to claim 12, wherein, when the first portion of the rotatable shaft is engaged with the first rotatable coupling, the second portion of the rotatable shaft is engaged with the second rotatable coupling, and the output of the rotary actuator is engaged with the second rotatable coupling, the predetermined angular range is set such that the rotatable shaft is only rotatable in an angular range where the spring exerts a non-zero torque in a second direction on the first portion of the rotatable shaft, the second direction being opposite to the first direction.

14. The apparatus according to claim 12, wherein:
the spring return module of the coupling device further comprises:
a limiter element that is arranged to rotate with the first rotatable coupling; and
one or more stopping surfaces comprising a first stopping surface arranged to abut a first limiter surface on the limiter element when the first rotatable coupling is in a first predetermined rotational position, to thereby limit rotation of the first rotatable coupling about the rotation axis in a second direction, the second direction being opposite to the first direction; and
the rotation limiter is configured to stop rotation of the second rotatable coupling about the rotation axis in the second direction before the first predetermined rotational position is reached.

* * * * *